(12) United States Patent
Roberts et al.

(10) Patent No.: US 8,385,747 B2
(45) Date of Patent: Feb. 26, 2013

(54) SIGNAL EQUALIZER IN A COHERENT RECEIVER

(75) Inventors: Kim B. Roberts, Nepean (CA); Han Sun, Ottawa (CA)

(73) Assignee: Ciena Corporation, Hanover, MD (US)

( * ) Notice: Subject to any disclaimer, the term of this patent is extended or adjusted under 35 U.S.C. 154(b) by 69 days.

(21) Appl. No.: 13/160,579

(22) Filed: Jun. 15, 2011

(65) Prior Publication Data

US 2011/0243573 A1 Oct. 6, 2011

Related U.S. Application Data

(63) Continuation of application No. 11/950,585, filed on Dec. 5, 2007, now Pat. No. 8,005,368.

(51) Int. Cl.
*H04B 10/00* (2006.01)

(52) U.S. Cl. ......... 398/150; 398/65; 398/81; 398/147; 398/148; 398/149; 398/204; 398/205; 398/206; 398/208; 398/152

(58) Field of Classification Search .................... 398/65, 398/81, 147–150
See application file for complete search history.

(56) References Cited

U.S. PATENT DOCUMENTS

| | | | | |
|---|---|---|---|---|
| 4,631,734 A * | 12/1986 | Foschini | ............... | 375/235 |
| 4,635,276 A * | 1/1987 | Karabinis | ............... | 375/235 |
| 4,644,562 A * | 2/1987 | Kavehrad et al. | ............... | 375/232 |
| 6,690,748 B2 * | 2/2004 | Martin | ............... | 375/324 |
| 6,782,211 B1 * | 8/2004 | Core | ............... | 398/205 |
| 6,952,460 B1 * | 10/2005 | Van Wechel et al. | ............... | 375/350 |
| 7,039,330 B2 * | 5/2006 | Lenosky | ............... | 398/208 |
| 7,161,980 B2 * | 1/2007 | Dittrich et al. | ............... | 375/233 |
| 7,197,095 B1 * | 3/2007 | Van Wechel et al. | ............... | 375/350 |
| 7,315,575 B2 * | 1/2008 | Sun et al. | ............... | 375/229 |
| 7,529,329 B2 * | 5/2009 | Popescu et al. | ............... | 375/354 |
| 7,532,822 B2 * | 5/2009 | Sun et al. | ............... | 398/155 |
| 7,555,227 B2 * | 6/2009 | Bontu et al. | ............... | 398/202 |
| 7,580,454 B2 * | 8/2009 | Carrer et al. | ............... | 375/233 |
| 7,606,498 B1 * | 10/2009 | Wu et al. | ............... | 398/152 |
| 7,623,797 B2 * | 11/2009 | Crivelli et al. | ............... | 398/208 |
| 7,627,252 B2 * | 12/2009 | Sun et al. | ............... | 398/155 |
| 7,636,525 B1 * | 12/2009 | Bontu et al. | ............... | 398/208 |
| 7,701,842 B2 * | 4/2010 | Roberts et al. | ............... | 370/210 |
| 7,715,720 B2 * | 5/2010 | Shpantzer et al. | ............... | 398/82 |
| 7,769,305 B1 * | 8/2010 | Roberts et al. | ............... | 398/206 |
| 2002/0061752 A1 * | 5/2002 | Kurokami | ............... | 455/447 |
| 2005/0196176 A1 * | 9/2005 | Sun et al. | ............... | 398/152 |
| 2006/0013296 A1 * | 1/2006 | Carrer et al. | ............... | 375/232 |
| 2006/0013597 A1 * | 1/2006 | Crivelli et al. | ............... | 398/208 |
| 2006/0140291 A1 * | 6/2006 | Thomas | ............... | 375/260 |
| 2006/0285855 A1 * | 12/2006 | Sun et al. | ............... | 398/152 |
| 2007/0092259 A1 * | 4/2007 | Bontu et al. | ............... | 398/147 |
| 2007/0092260 A1 * | 4/2007 | Bontu et al. | ............... | 398/152 |
| 2008/0151936 A1 * | 6/2008 | Desai et al. | ............... | 370/473 |
| 2009/0148164 A1 * | 6/2009 | Roberts et al. | ............... | 398/65 |
| 2009/0256622 A1 * | 10/2009 | Roberts | ............... | 327/512 |
| 2010/0092181 A1 * | 4/2010 | Roberts et al. | ............... | 398/159 |
| 2011/0243573 A1 * | 10/2011 | Roberts et al. | ............... | 398/152 |

* cited by examiner

*Primary Examiner* — Danny Leung

(74) *Attorney, Agent, or Firm* — Kent Daniels; Daniels IP Services, Ltd

(57) ABSTRACT

A signal equalizer for compensating impairments of an optical signal received through a link of a high speed optical communications network. At least one set of compensation vectors are computed for compensating at least two distinct types of impairments. A frequency domain processor is coupled to receive respective raw multi-bit in-phase (I) and quadrature (Q) sample streams of each received polarization of the optical signal. The frequency domain processor operates to digitally process the multi-bit sample streams, using the compensation vectors, to generate multi-bit estimates of symbols modulated onto each transmitted polarization of the optical signal. The frequency domain processor exhibits respective different responses to each one of the at least two distinct types of impairments.

22 Claims, 8 Drawing Sheets

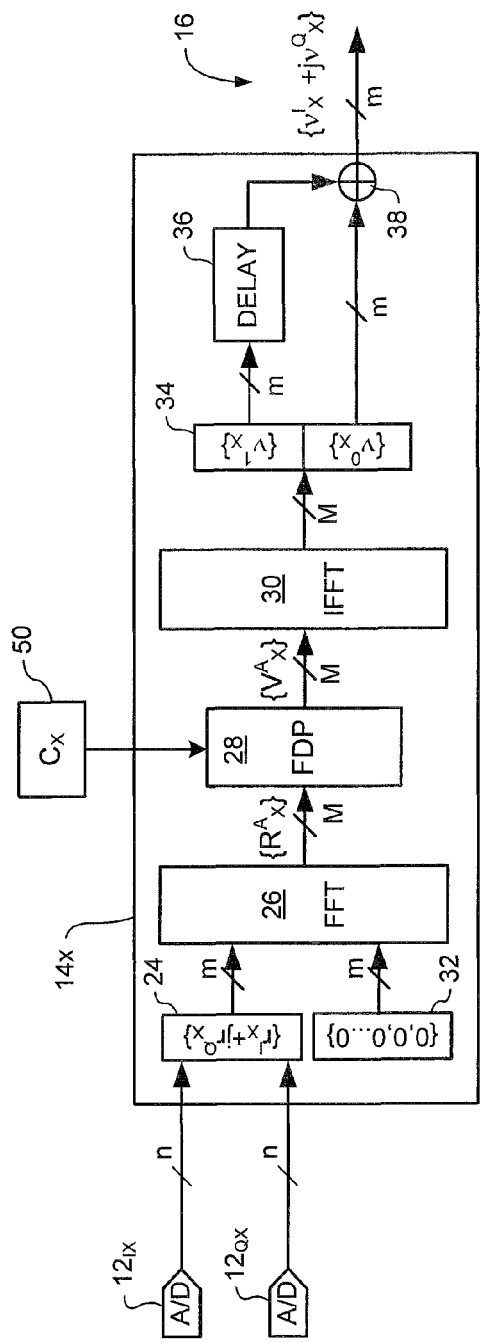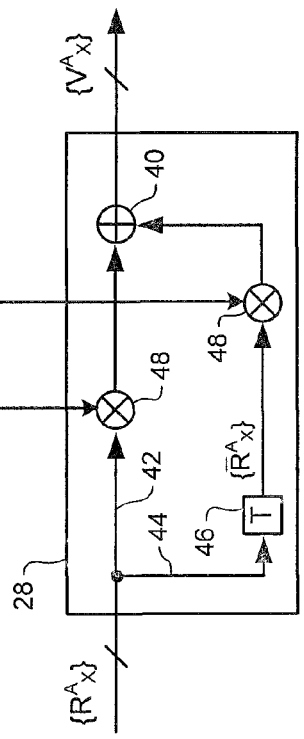
Figure 2a (Prior Art)
Figure 2b (Prior Art)

SIGNAL EQUALIZER IN A COHERENT RECEIVER

CROSS-REFERENCE TO RELATED APPLICATIONS

This application is a continuation of U.S. patent application Ser. No. 11/950,585, filed Dec. 5, 2007, the entire contents of which are hereby incorporated herein by reference.

TECHNICAL FIELD

The present invention relates to high-speed optical communications networks, and in particular to a signal equalizer in a coherent optical receiver.

BACKGROUND OF THE INVENTION

Optical signals received through conventional optical links are typically distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$ Hz are commonly encountered. Various methods and systems intended to address some of these limitations are known in the art.

FIG. 1 schematically illustrates a representative coherent optical receiver capable of implementing the methods of Applicant's co-pending U.S. patent applications Ser. No. 11/294,613 filed Dec. 6, 2005 and entitled "Polarization Compensation In A Coherent Optical Receiver"; Ser. No. 11/366,392 filed Mar. 2, 2006 and entitled "Carrier Recovery In A Coherent Optical Receiver"; and Ser. No. 11/423,822 filed Jun. 13, 2006 and entitled "Signal Acquisition In A Coherent Optical Receiver", the content of all of which are hereby incorporated herein by reference.

As may be seen in FIG. 1, an inbound optical signal is received through an optical link 2, split into orthogonal received polarizations by a Polarization Beam Splitter 4, and then mixed with a Local Oscillator (LO) signal 6 by a conventional 90° optical hybrid 8. The composite optical signals emerging from the optical hybrid 8 are supplied to respective photodetectors 10, which generate corresponding analog electrical signals. The photodetector signals are sampled by respective Analog-to-Digital (A/D) converters 12 to yield raw multi-bit digital signals $I_X$, $Q_X$ and $I_Y$, $Q_Y$ corresponding to In-phase (I) and Quadrature (Q) components of each of the received polarizations.

Preferably, the raw multi-bit digital signals have resolution of n=5 or 6 bits which has been found to provides satisfactory performance at an acceptable cost. In the above-noted U.S. patent applications, the sample rate of the A/D converters 12 is selected to satisfy the Nyquist criterion for the highest anticipated symbol rate of the received optical signal. Thus, for example, in the case of an optical network link 2 having a line rate of 10 GBaud, the sample rate of the A/D converters 12 will be approximately 20 GHz.

From the A/D converter 12 block, the respective n-bit signals $I_X$, $Q_X$ and $I_Y$, $Q_Y$ of each received polarization are supplied to a respective dispersion compensator 14, which operates on the raw digital signals to at least partially compensate chromatic dispersion of the received optical signal. The dispersion compensators 14 may be configured to operate as described in Applicant's co-pending U.S. patent application Ser. No. 11/550,042 filed Oct. 17, 2006, and summarized below with reference to FIGS. 2a and 2b.

As may be seen in FIG. 2a, each dispersion compensator (CD-COMP) 14 is provided as a high speed digital signal processor (or, equivalently, either an Application Specific Integrated Circuit, ASIC, or a Field Programmable Gate Array, FPGA) which is capable of implementing a variety of processing functions. In the illustrated embodiment, two substantially identical CD-COMPs 14 are provided, each of which is connected to receive and process raw In-phase and Quadrature digital signals of a respective received polarization. For simplicity only the X-polarization CD-COMP $14_x$ is illustrated in FIG. 2a, it being understood that the Y-polarization CD-COMP $14_y$ will be substantially identical.

In the embodiment of FIG. 2a, the CD-COMP 14 generally comprises a pipelined series of functional blocks, including a deserializer 24, a Fast Fourier Transform (FFT) filter 26, a frequency domain processor (FDP) 28 and an Inverse Fast Fourier Transform (IFFT) filter 30.

The deserializer 24 operates to accumulate successive n-bit words of the In-phase and Quadrature digital signals $I_X$ and $Q_X$ from the X-polarization A/D converters $12_{IX}$ and $12_{QX}$ during a predetermined clock period. The accumulated n-bit words are then latched into the FFT 26 as a parallel input vector $\{r^I_X + jr^Q_X\}$. Preferably, each of the real and imaginary components of the parallel vector $\{r^I_X + jr^Q_X\}$ have the same resolution (n=5 or 6 bits, for example) as the raw digital signals. In general, the width (m), in words, of the input vector $\{r^I_X + jr^Q_X\}$ is selected to be half the width (M) of the FFT 26. In some embodiments, the FFT 26 has a width of M=256 taps, which implies an input vector width of m=128 complex values. However, a different FFT width may be selected, as desired. In practice, the FFT width is selected based on a compromise between circuit size and the amount of dispersion compensation desired.

The input vector $\{r^I_X + jr^Q_X\}$ is augmented with a null vector $\{0, 0, 0, \ldots 0\}$ 32 which provides a zero data fill to the remaining input taps of the FFT 26.

The FFT filter 26 performs a conventional FFT operation to generate an array $\{R^A_X\}$ representing the frequency domain spectrum of the input vector $\{r^I_X + jr^Q_X\}$. The FDP 28 can then implement any of a variety of frequency domain processing functions, as will be described in greater detail below, to yield a modified array $\{V^A_X\}$, which is supplied to the IFFT filter 30.

The IFFT filter 30 performs a conventional Inverse Fast Fourier Transform operation to yield time domain data 34, in the form of a complex valued vector having a width equal to the IFFT 30, which, in the illustrated embodiment is M taps. In the embodiment of FIG. 2a, the IFFT output data 34 is divided into two blocks $\{v^0_X\}$, and $\{v^1_X\}$, of which $\{v^1_X\}$ is delayed by one clock cycle (at 36) and added to $\{v^0_X\}$ (at 38) to yield the CD-COMP output 16 in the form of a complex valued vector $\{v^I_X + jv^Q_X\}$ encompassing m(=128) complex values.

In the system of FIGS. 2a and 2b, the FDP 28 implements a transpose-and-add function, along with dispersion compensation. In general, the transpose-and-add function operates to add the FFT output vector $\{R^A_X\}$ to a transposed version of itself $\{\overline{R}_X^A\}$, with respective different compensation vectors. Implementing the transpose-and-add operation between the complex FFT and IFFT filters has the effect of emulating a pair of parallel real-FFT and IFFT functions through the CD-COMP 14, without requiring the additional circuits needed for parallel real FFT and IFFT filters. The transpose-and-add function can be conveniently implemented in hardware, by providing a pair of parallel paths between the FFT output and a vector addition block 40. One of these paths may be referred to as a direct path 42, in which the tap-order of the FFT output $\{R^A{}_X\}$ is retained. The other path, which may be referred to as a transpose path 44, includes a transposition block 46 which operates to reverse the tap-order of the FFT output, upstream of the vector addition block 40. In this respect, it will be recognised that the transposition block 46 can be readily implemented in hardware, which provides an advantage in that the transposition step does not incur a significant propagation delay penalty.

Preferably, the direct and transpose paths 42 and 44 are provided with a respective multiplication block 48, which enables various filter functions to be implemented by the FDP 28. For example, in the embodiment of FIG. 2b, a pair of compensation vectors $\{C^O{}_X\}$ and $\{C^T{}_X\}$ 50 are applied to the direct and transpose paths, 42 and 44 respectively. Each of the compensation vectors $\{C^O{}_X\}$ and $\{C^T{}_X\}$ is composed of a respective set of coefficients which are calculated to apply a desired function, in the frequency-domain, to the digital signals. For example, $\{C^O{}_X\}$ and $\{C^T{}_X\}$ may be calculated to apply a first-order dispersive function to at least partially compensate chromatic dispersion of the optical link. $\{C^O{}_X\}$ and $\{C^T{}_X\}$ may also incorporate a transform of a differential delay function, so as to compensate residual sample phase errors in the I and Q digital signals. When both of these functions are implemented by the compensation vectors $\{C^O{}_X\}$ and $\{C^T{}_X\}$, the CD-COMP output 16 will represent a dispersion-compensated and phase-error corrected version of the raw $I_X$ and $Q_X$ digital signals received from the A/D converters 12.

Returning to FIG. 1, the dispersion-compensated digital signals 16 appearing at the output of the dispersion compensators 14 are then supplied to a polarization compensator 18 which operates to compensate polarization effects, and thereby de-convolve transmitted symbols from the complex signals 16 output from the dispersion compensators 14. If desired, the polarization compensator 18 may operate as described in Applicant's co-pending U.S. patent application Ser. No. 11/294,613 filed Dec. 6, 2005 and Ser. No. 11/266,392 filed Mar. 2, 2006. The output of the polarization compensator 18 is a pair of multi-bit estimates X'(n) and Y'(n), 20 of the symbols encoded on each transmitted polarization. The symbol estimates X'(n), Y'(n) appearing at the output of the polarization compensator 18 are then supplied to a carrier recovery block 22 for LO frequency control, symbol detection and data recovery, such as described in Applicant's co-pending U.S. patent application Ser. No. 11/366,392 filed Mar. 2, 2006.

In the above described system, the dispersion compensators 14 operates across a large number of successive samples (e.g. 128 samples), which permits compensation of relatively severe chromatic dispersion, but at a cost of a relatively slow response to changing dispersion. This slow response is acceptable, because of the known slow rate of change of dispersion in real-world optical links. The polarization compensator 18, in contrast, is comparatively very narrow (e.g. on the order of about 5 samples), to enable a rapid update frequency, which is necessary to track observed high-speed polarization transients.

The above-described system provides reliable signal acquisition, compensation of dispersion and polarization effects, carrier recovery and data recovery even in the presence of moderate-to-severe optical impairments. This, in turn, enables the deployment of a coherent optical receiver in real-world optical networks, with highly attractive signal reach and line rate characteristics. For example, a receiver implementing the above methods has demonstrated a signal reach of 1500 km at a line rate of 10 Gbaud (i.e. $10^9$ symbols/second). It is noteworthy that this performance has been measured with real-time continuous processing, not just burst data acquisition followed by off-line processing or simulation. The system described above with reference to FIGS. 1 and 2 is the only coherent optical receiver known to the applicants to have achieved such real-time performance.

With increasing demand for link band-width, it would be desirable to increase the line rate beyond 10 Gbaud. For example, lines rates of 35 GBaud and higher have been proposed. However, as the symbol rate is increased, the amount of distortion compensation that is required in order to obtain the same signal reach also increases. For example, the required amount of dispersion compensation increases proportional to the square of the symbol rate, while the required amount of compensation for polarization effects increases proportional to the symbol rate. These increases in distortion compensation can be met, using the system described above, but at a cost of increased size and/or complexity of the dispersion and polarization compensation blocks.

At the same time, increasing the line rate also necessitates an increase in the sample rate of the A/D converters and downstream digital circuits, in order to maintain Nyquist sampling.

It will be appreciated that both increased circuit size and increased sample rate imply that the power consumption of the receiver must necessarily also increase, as will the heat generated by the circuits during run-time. This can impose an effective "thermal barrier" to increasing the line rate, as higher temperatures degrade system reliability.

Accordingly, methods and techniques that enable reliable operation of a coherent optical receiver at line rates above 10 Gbaud are highly desirable.

SUMMARY OF THE INVENTION

The present invention addresses the above-noted problems by providing a signal equalizer capable of compensating both dispersion and polarization, but which is nevertheless agile enough to track high-speed polarization transients.

Thus, an aspect of the present invention provides a signal equalizer for compensating impairments of an optical signal received through a link of a high speed optical communications network. At least one set of compensation vectors are computed for compensating at least two distinct types of impairments. A frequency domain processor is coupled to receive respective raw multi-bit in-phase (I) and quadrature (Q) sample streams of each received polarization of the optical signal. The frequency domain processor operates to digitally process the multi-bit sample streams, using the compensation vectors, to generate multi-bit estimates of symbols modulated onto each transmitted polarization of the optical signal. The frequency domain processor exhibits respective different responses to each one of the at least two distinct types of impairments.

BRIEF DESCRIPTION OF THE DRAWINGS

Further features and advantages of the present invention will become apparent from the following detailed description, taken in combination with the appended drawings, in which:

FIGS. 2a and 2b are a block diagram schematically illustrating principal elements and operations of the dispersion compensation block of FIG. 1, known from Applicant's co-pending U.S. patent application Ser. No. 11/550,042;

It will be noted that throughout the appended drawings, like features are identified by like reference numerals.

DETAILED DESCRIPTION OF THE PREFERRED EMBODIMENT

The present invention provides an agile signal equalizer for compensating dispersion and polarization impairments in a coherent optical receiver of a high speed optical network. Embodiments of the present invention are described below, by way of example only, with reference to FIGS. 3-7.

Figure 1:
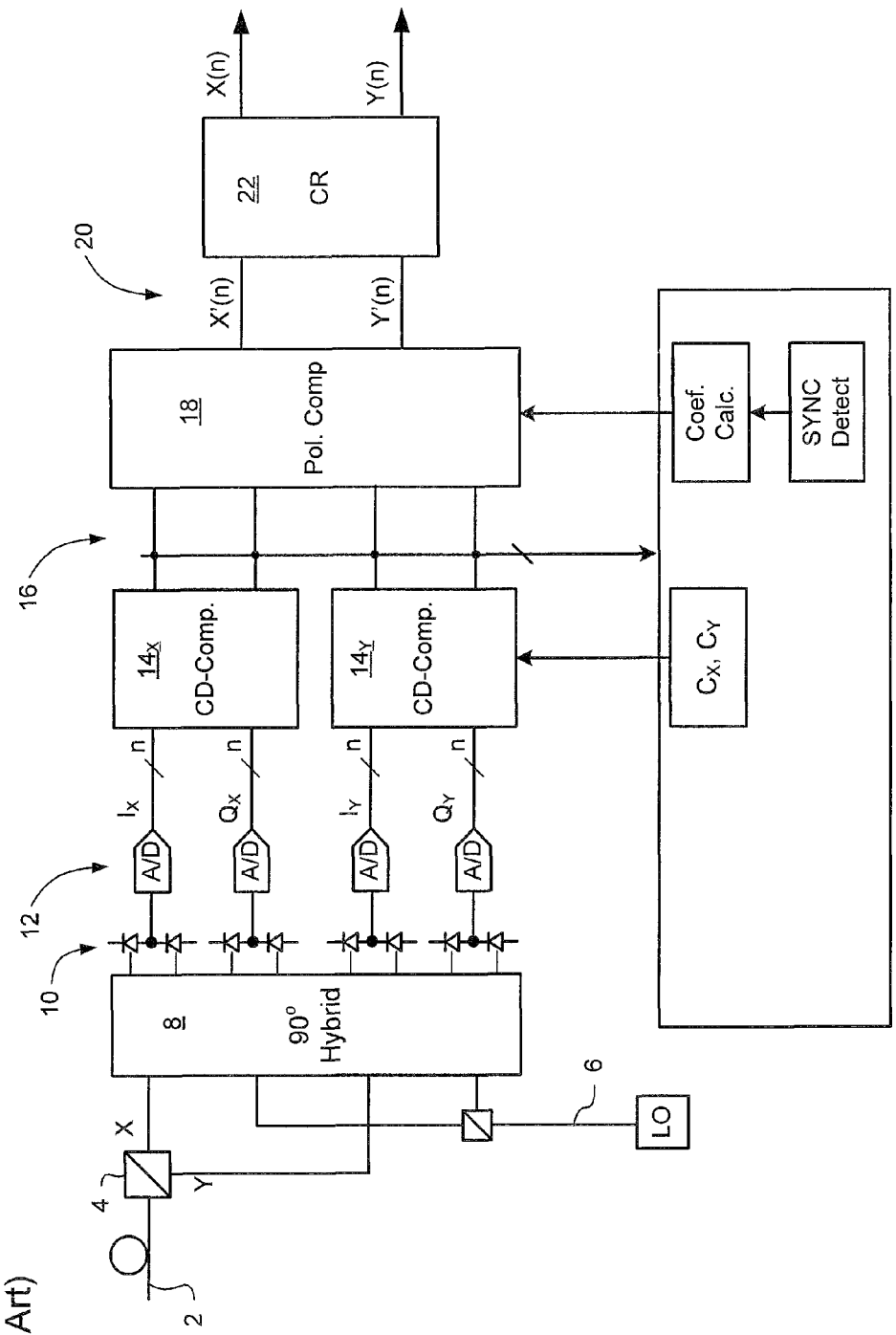
FIG. 1 is a block diagram schematically illustrating principal elements and operations of a coherent optical receiver known from Applicant's co-pending U.S. patent applications Ser. Nos. 11/294,613; 11/315,342; 11/315,345; 11/366,392; and 11/423,822.
Figure 3:
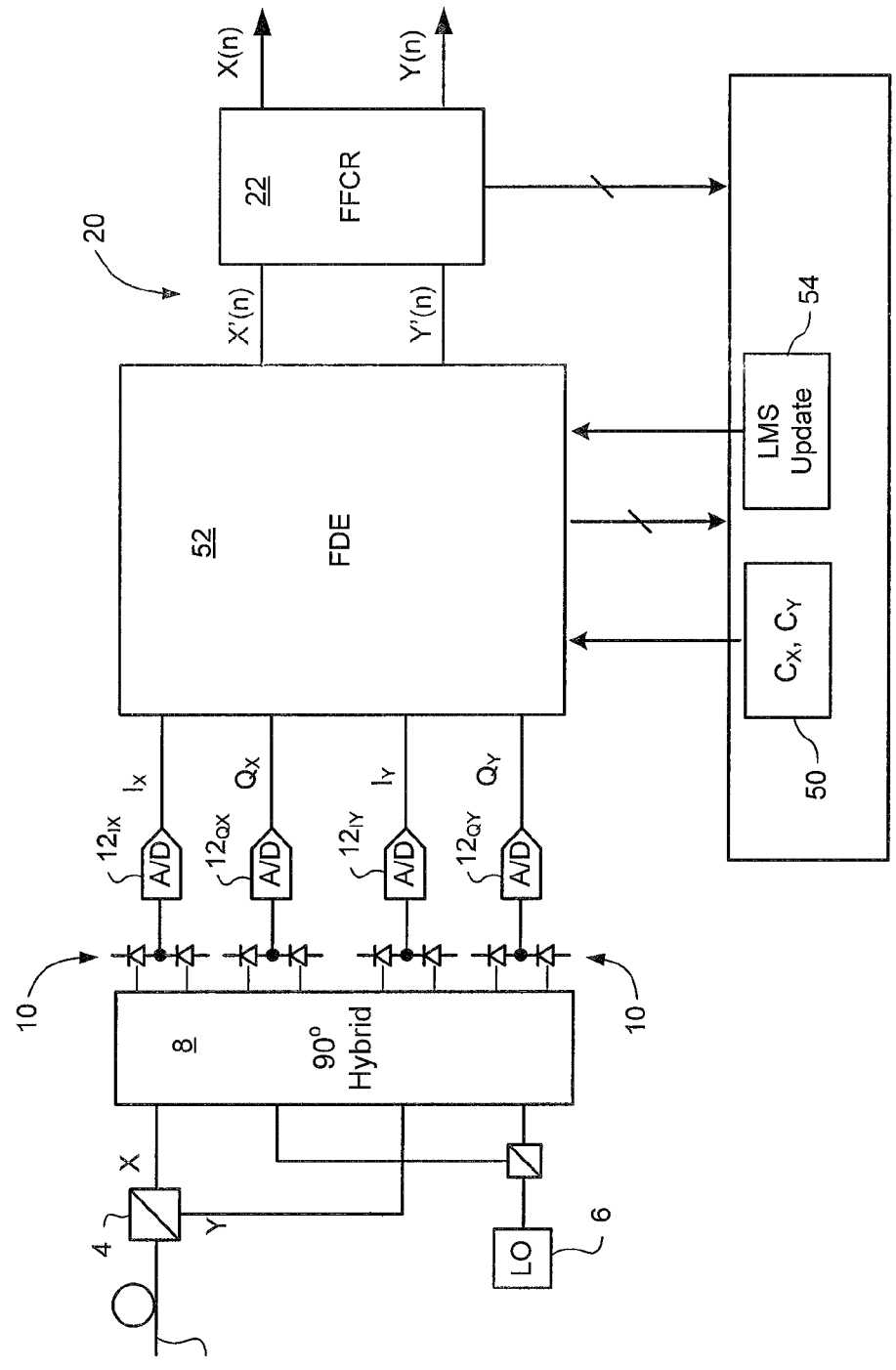
FIG. 3 is a block diagram schematically illustrating principal elements and operations of a coherent optical receiver in accordance with an embodiment of the present invention.

FIG. 3 illustrates principle elements of a coherent optical receiver which incorporates an agile signal equalizer 52 in accordance with the present invention. As may be seen in FIG. 3, the agile signal equalizer 52 combines the functionality of the dispersion compensation and polarization compensation blocks 14 and 18 of the system of FIG. 1. Thus, the agile signal equalizer 52 is capable of correcting timing errors between I and Q sample streams of each received polarization, compensating moderate to severe chromatic dispersion, and compensating polarization effects to thereby de-convolve symbols modulated onto each of the transmitted polarizations from the received signals.

As described in Applicant's U.S. patent application Ser. No. 11/294,613 filed Dec. 6, 2005, separating the dispersion and polarization compensation blocks, in the manner described above in respect of FIGS. 1 and 2, has the advantage of enabling different compensation response times for each compensation block. Thus, the dispersion compensation block 14 is very wide to enable compensation of moderate to severe dispersion, and the associated slow response (for recalculating the compensation coefficients $C_X$ and $C_Y$) is acceptable because dispersion is typically a slowly changing phenomenon. Conversely, the polarization compensation block 18 is, by comparison, very narrow, to facilitate a rapid response to polarization rotation transients. Combining both dispersion and polarization compensation into a common equalizer would be beneficial because it reduces the total number of gates required by the compensation circuitry, thereby reducing power consumption and associated heat dissipation problems. However, these potential advantages come at a cost of reductions in either or both of dispersion compensation performance and responsiveness to polarization transients.

Figure 4:
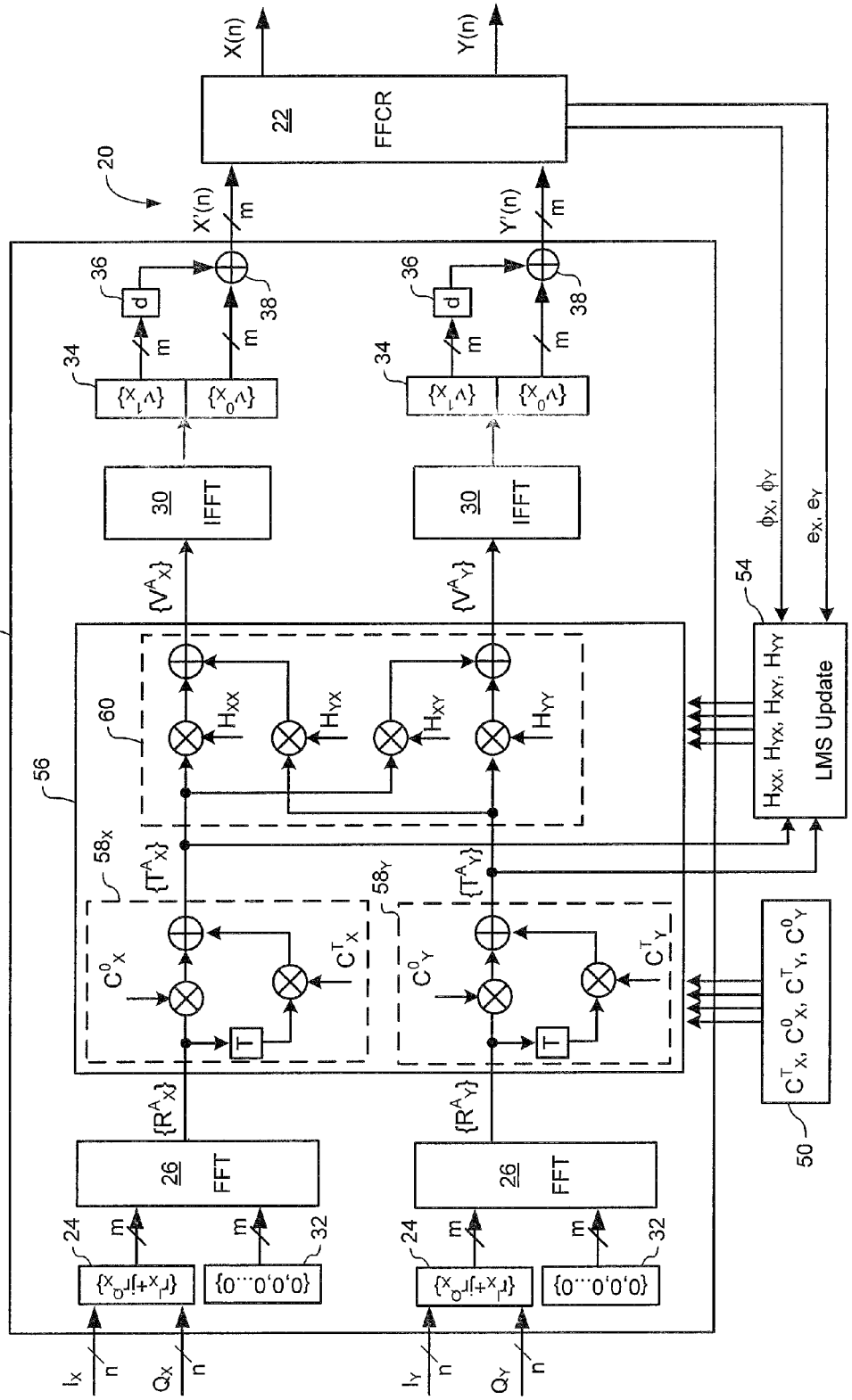
FIG. 4 is a block diagram schematically illustrating principal elements and operations of the equalizer of FIG. 3.

The present invention overcomes this difficulty by providing an agile signal equalizer 52 which has sufficient width to enable compensation of moderate-to-severe dispersion. A high-speed Least Mean Squares (LMS) update block 54 provides recalculation of compensation coefficients at a sufficiently high speed to enable tracking of polarization transients. A representative coherent optical receiver incorporating the signal equalizer is described below with reference to FIG. 3. A representative embodiment of the signal equalizer 52 is illustrated in FIG. 4. Representative embodiments of the LMS update block 54 are described below with reference to FIGS. 5-7.

As may be seen in FIG. 3, a coherent optical receiver incorporating the signal equalizer 52 of the present invention generally comprises a Polarization Beam Splitter 4; 90° optical hybrid 8; photodetectors 10; and A/D converters 12, all of which may operate as described above with reference to FIG. 1. The raw digital sample streams $I_X$, $Q_X$, and $I_Y$, $Q_Y$ generated by the A/D converters 12 are then supplied to the signal equalizer 52. If desired, timing control methods described in Applicant's co-pending U.S. patent application Ser. No. 11/550,042 filed Oct. 17, 2006, including the use of elastic stores (not shown in FIG. 3) between the A/D converters 12 and the equalizer 52 may be used to ensure at least coarse phase alignment between samples at the equalizer input.

In general, the equalizer 52 operates to compensate chromatic dispersion and polarization rotation impairments. Consequently, the compensated signals 20 output from the equalizer 52 represent multi-bit estimates X'(n) and Y'(n) of the symbols encoded on each transmitted polarization of the received optical signal. The symbol estimates 20 X'(n), Y'(n), are supplied to a carrier recovery block 22 for LO frequency control, symbol detection and data recovery, such as described in Applicant's co-pending U.S. patent application Ser. No. 11/366,392 filed Mar. 2, 2006.

In the embodiment of FIG. 4, the equalizer 52 generally follows the construction of the dispersion compensators 14 described above with reference to FIGS. 1 and 2. Thus, the raw digital sample streams $I_X$, $Q_X$, and $I_Y$, $Q_Y$ generated by the A/D converters 12 are deserialized (at 24) and the resulting m-word input vectors $\{r^I_X + jr^Q_X\}$ and $\{r^I_Y + jr^Q_Y\}$ latched into the respective X- and Y-polarization FFT blocks 26. The arrays $\{R^A_X\}$ and $\{R^A_Y\}$ output by the FFT blocks 26 are then supplied to a Frequency Domain Processor (FDP) 56, as will be described below.

The modified arrays $\{V^A_X\}$ and $\{V^A_Y\}$ output by the FDP are supplied to respective IFFT blocks 30, and the resulting time domain data 34 processed using respective overlap-and-add as described above with reference to FIG. 2a, to yield the equalizer output 20 in the form of complex valued vectors $\{v^I_X + jv^Q_X\}$ and $\{v^I_Y + jv^Q_Y\}$, each of which encompasses m complex valued estimates X'(n) and Y'(n) of the transmitted symbols.

In the embodiment of FIG. 4, the FDP 56 comprises a respective transpose-and-add functional block 58 for each polarization, and a cross-compensation block. The transpose-and-add block 58 operates in generally the same manner as described above with reference to FIG. 2b. Thus, the X-polarization transpose-and-add block 58x operates to add the FFT output array $\{R^A_X\}$ to a transposed version of itself $\{\overline{R}_X^A\}$, with respective different compensation vectors $\{C^O_X\}$ and $\{C^T_X\}$, to yield intermediate array $\{T^A_X\}$. As described above, compensation vectors $\{C^O_X\}$ and $\{C^T_X\}$ can be computed to at least partially compensate chromatic dispersion of the optical link and/or to compensate residual sample phase errors in the raw digital signals generated by the A/D converters 12. Of course, the Y-polarization transpose-and-add block 58x will operate in an exactly analogous manner.

The cross-compensation block 60 applies X-polarization vectors $H_{XX}$, $H_{XY}$ to the X-polarization intermediate array $\{T^A_X\}$, and Y-polarization vectors $H_{YY}$, $H_{YX}$ to the Y-polarization intermediate array $\{T^A_Y\}$. The multiplication results are then added together to generate modified vectors $\{V^A_X\}$ and $\{V^A_Y\}$, as may be seen in FIG. 4. The X- and Y-polarization vectors $H_{XX}$, $H_{XY}$, $H_{YY}$ and $H_{YX}$ are preferably computed using a transform of the total distortion at the output of the equalizer 52, as will be described in greater detail below. At a minimum, the X- and Y-polarization vectors $H_{XX}$, $H_{XY}$, $H_{YY}$ and $H_{YX}$ impose a phase rotation which compensates polarization impairments of the optical signal, and so de-convolve the transmitted symbols from the raw digital sample streams $I_X$, $Q_X$, and $I_Y$, $Q_Y$ generated by the A/D converters 12. Those of ordinary skill in the art will recognise that the illustrated cross-compensation block 60 implements an inverse-Jones matrix transfer function, which compensates the polarization effects. In this formulation, the vectors $H_{XX}$, $H_{XY}$, $H_{YY}$ and $H_{YX}$ are provided as the coefficients of the inverse-Jones matrix. The width of the inverse-Jones matrix is equal to that of the intermediate arrays $\{T^A{}_X\}$ and $\{T^A{}_Y\}$, and so is based on the expected maximum dispersion of the received optical signal to be compensated by the equalizer 52.

Preferably, the X- and Y-polarization vectors $H_{XX}$, $H_{XY}$, $H_{YY}$ and $H_{YX}$ are computed at sufficient speed to enable tracking, and thus compensation, of high-speed polarization rotation transients. This may be accomplished using the Least Mean Squares (LMS) update loop illustrated in FIG. 4, and described in greater detail below with reference to FIGS. 5 and 6.

Figure 5A:
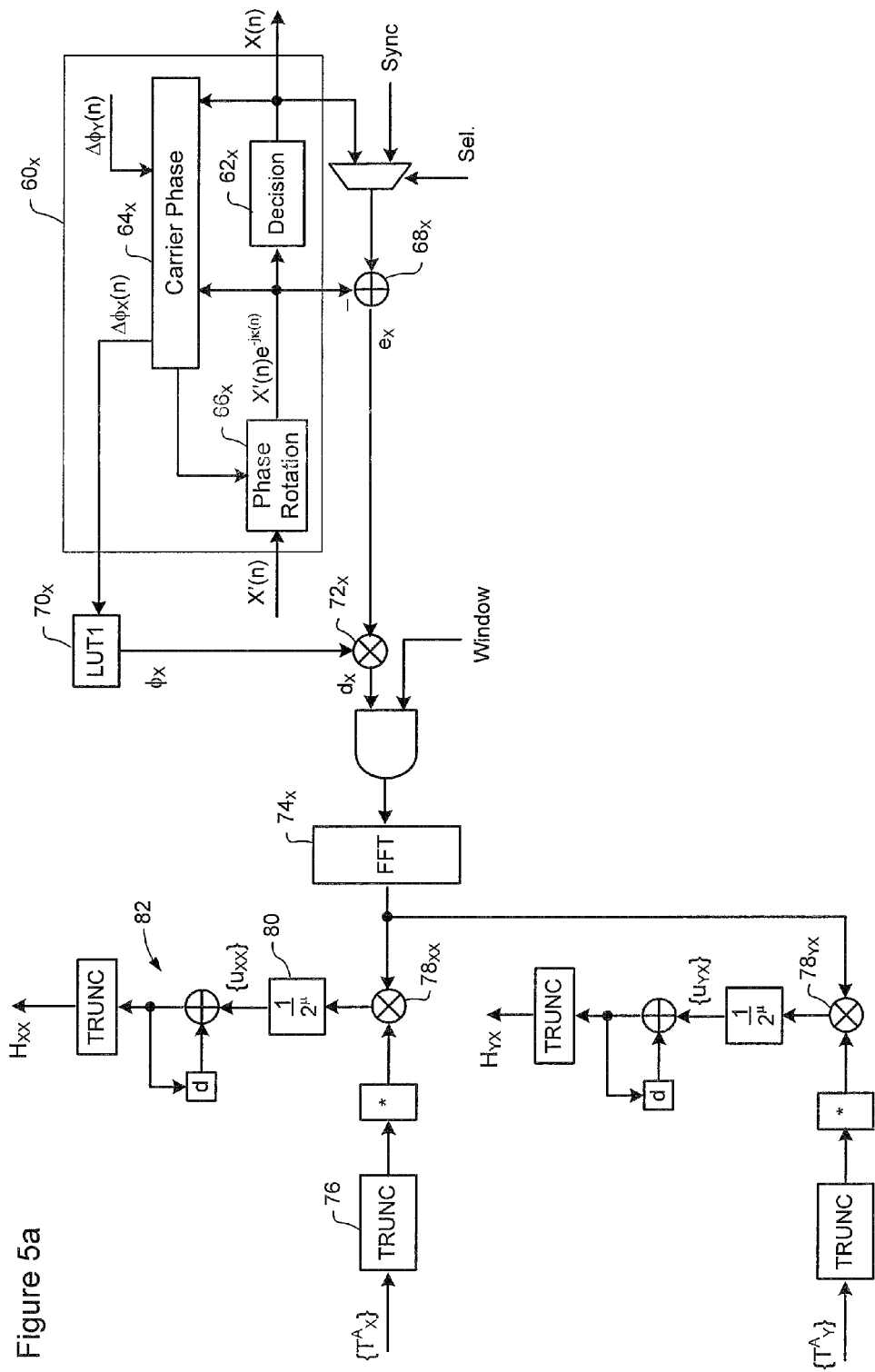
FIGS. 5a and 5b illustrate representative LMS loops for computing polarization compensation vectors in accordance with a first embodiment of the present invention.
Figure 5B:
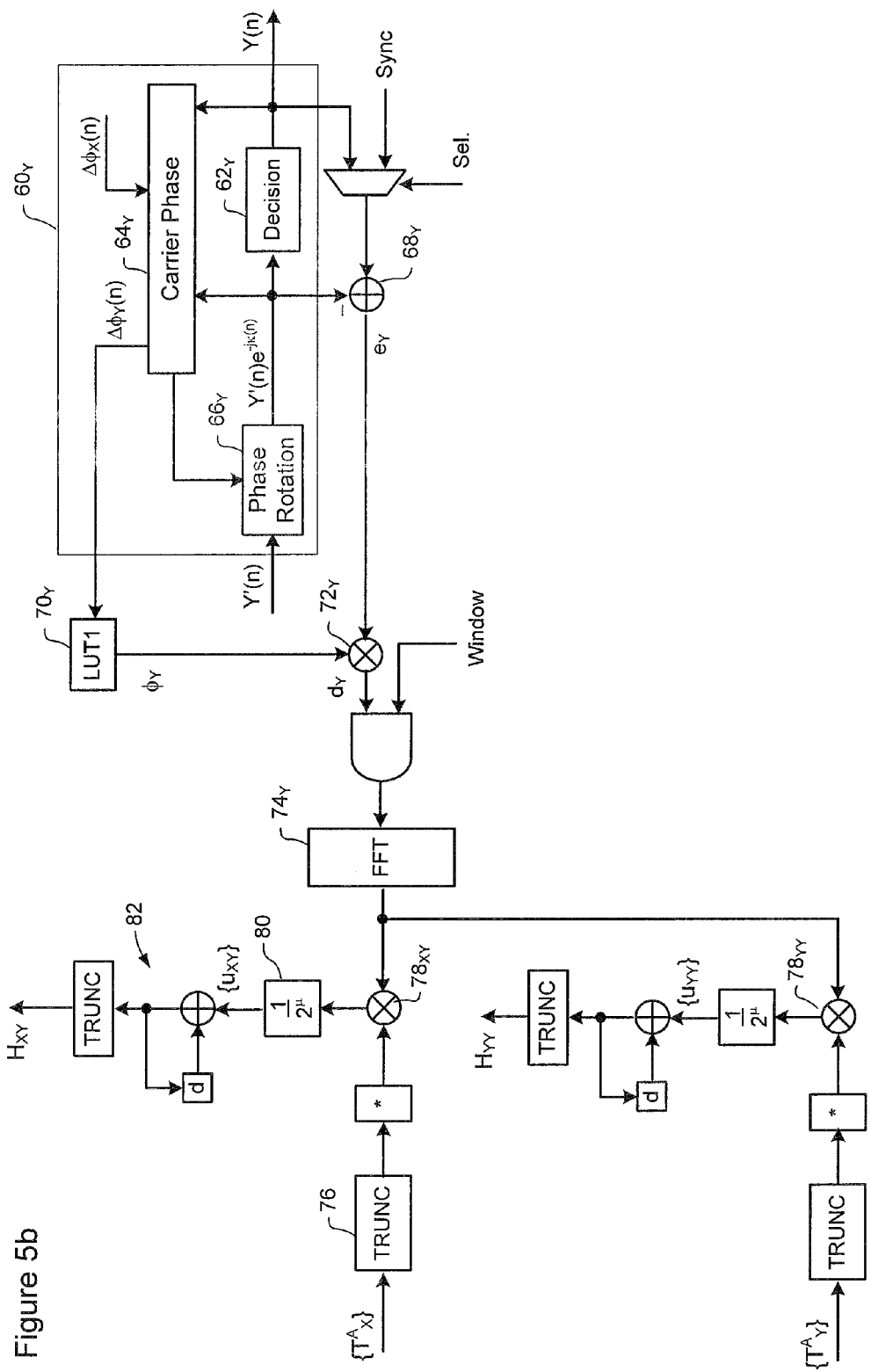

FIG. 5a shows an LMS update loop, according to one embodiment of the invention, for calculating polarization vectors $H_{XX}$ and $H_{YX}$. A directly analogous LMS loop for calculating the polarization vectors $H_{XY}$ and $H_{YY}$ is shown in FIG. 5b. In the embodiment of FIGS. 5a and 5b, the carrier recovery block 22 operates as described in Applicant's co-pending U.S. patent application Ser. No. 11/366,392 filed Mar. 2, 2006. Thus, the carrier recovery block 22 is divided into two parallel processing paths 60 (only the X-polarization path 60x is shown in FIG. 5a, and the Y-polarization path 60y is shown in FIG. 5b), each of which includes a decision circuit 62 and a carrier recovery loop comprising a carrier phase detector 64 and a phase rotator 66. In general, the phase rotators 66 use a carrier phase estimate generated by the respective carrier phase detector 64 to compute and apply a phase rotation $\kappa(n)$ to the symbol estimates X'(n) and Y'(n) received from the signal equalizer 52. The decision circuits 62 use the phase-rotated symbol estimates $X'(n)e^{-j\kappa(n)}$ and $Y'(n)e^{-j\kappa(n)}$ to generate recovered symbol values X(n) and Y(n), and the phase detectors 64 operate to detect respective phase errors $\Delta\phi$ between the rotated symbol estimates $X'(n)e^{-j\kappa(n)}$ and $Y'(n)e^{-j\kappa(n)}$ and the corresponding recovered symbol values X(n) and Y(n).

Referring to FIG. 5a, the $H_{XX}$ LMS update loop receives the phase error $\Delta\phi_X(n)$ of each successive symbol estimate X'(n), which is calculated by the phase detector 64 as described in Applicant's co-pending U.S. patent application Ser. No. 11/366,392. In addition, the rotated symbol estimate $X'(n)e^{-j\kappa(n)}$ and its corresponding decision value X(n) are also received from the carrier recovery block 22, and compared (at 68) to obtain a complex symbol error value $e_X$, which is indicative of residual distortion of the symbol estimate X'(n). In some embodiments it is desirable to format the optical signal into data bursts comprising a plurality of data symbols separated by a SYNC burst having a known symbol sequence. In such cases, a selector can be used to supply a selected one of the decision values X(n) and the known SYNC symbols to the comparator 68. With this arrangement, the selector can be controlled to supply the known SYNC symbol sequence to the comparator during each SYNC burst, so that the error value $e_X$ is computed using the known SYNC symbols rather than the (possibly erroneous) decision values X(n).

In order minimize calculation complexity through the LMS update loop, the resolution of the complex symbol error $e_X$ is preferably lower than that of the symbol estimate X'(n). For example, in an embodiment in which the symbol estimate X'(n) has a resolution of 7 bits for each of the real and imaginary parts (denoted herein as "7+7 bits"), the complex symbol error $e_X$ may have a resolution of, for example, 3+3 bits. It will be noted, however, that the present invention is not limited to these resolution values.

The phase error $\Delta\phi_X(n)$ is processed, for example using a Look-up-Table (LUT) 70, to generate a corresponding complex value $\phi_X$ having a unit amplitude and the same phase as $\Delta\phi_X(n)$, with a desired resolution (e.g. 3+3 bits) matching that of the symbol error $e_X$. This allows the phase error $\phi_X$ and symbol error $e_X$ to be multiplied together (at 72) to obtain a complex vector $d_X$ indicative of the total residual distortion of the symbol estimate X'(n).

Applicant's U.S. patent application Ser. No. 11/423,822 filed Jun. 13, 2006 describes methods and systems for signal acquisition in a coherent optical receiver. As described in U.S. patent Application Ser. No. 11/423,822, during a start-up operation of the receiver (or during recovery from a "loss-of frame" condition), LO frequency control, clock recovery, dispersion compensation and polarization compensation loops implement various methods to acquire signal, and stabilize to steady-state operation. During this "acquisitions period", the rotated symbol estimates $X'(n)e^{-j\kappa(n)}$ and their corresponding decision values X(n) are probably erroneous. Accordingly, in the embodiment illustrated in FIGS. 5a and 5b, a window select line may be used to zero out those values of the distortion vector $d_X$ which are computed from non-sync symbols. Values of the distortion vector $d_X$ which are computed from the known SYNC symbols are likely to be valid, even during signal acquisition, and thus are left unchanged.

In the illustrated embodiments, values of the distortion vector $d_X$ are generated at the symbol timing. In the case of Nyquist sampling, this is half the sample rate of the raw digital sample streams $I_X$, $Q_X$, and $I_Y$, $Q_Y$ generated by the A/D converters 12, and it is therefore necessary to adjust the timing of the error values $d_x$ to match the sample timing. In the case of T/2 sampling (that is, the sample period is one/half the symbol period T, which satisfies the Nyquist criterion), retiming of the error values $d_x$ can be accomplished by inserting one zero between each successive error value. If desired, Interpolation or other filtering can be performed upon the retimed stream of error values to enhance the loop stability and performance.

The resulting T/2 sampled symbol distortion vector is then input to a Fast Fourier Transform (FFT) block 74, which calculates the frequency domain spectrum of the symbol distortion vector $d_X$.

Preferably, the width of the FFT block 74 corresponds with that of the intermediate array $\{T^A{}_X\}$. With this arrangement, each value of the intermediate array $\{T^A{}_X\}$ can be truncated at 76 to match the resolution of the FFT block output (e.g. 3+3 bits), and then a conjugate of the truncated array multiplied with the FFT output array (at 78), to compute a low-resolution correlation between $\{T^A{}_X\}$ and the FFT output. This correlation vector is then scaled (at 80) to obtain an update vector $\{u_{xx}\}$, which is accumulated (at 82) to obtain a vector representation of the total distortion of the intermediate array $\{T^A{}_X\}$. Truncating the total distortion vector, for example by taking the 7+7 most significant bits, yields the cross-compensation vector $H_{XX}$.

As noted above, directly analogous methods can be used to compute each of the other cross-compensation vectors $H_{XY}$, $H_{YY}$ and $H_{YX}$, which are therefore not described herein in detail.

In embodiments in which the compensation vectors $\{C^O_X\}$, $\{C^T_X\}$, $\{C^O_Y\}$ and $\{C^T_Y\}$ are computed to compensate only residual sample phase errors in the raw digital sample streams $I_X$, $Q_X$, and $I_Y$, $Q_Y$, the symbol error $e_X$ will contain substantially all of the dispersion of the received optical signal 2. In this case, the dispersion will propagate through the LMS update loop(s) and the resulting cross compensation vectors $H_{XX}$, $H_{XY}$, $H_{YY}$ and $H_{YX}$ will provide at least partial compensation of the dispersion, in addition to applying a phase rotation to de-convolve the symbols modulated onto each polarization of the transmitted optical signal, from the raw digital sample streams $I_X$, $Q_X$, and $I_Y$, $Q_Y$.

In embodiments in which the compensation vectors $\{C^O_X\}$, $\{C^T_X\}$, $\{C^O_Y\}$, and $\{C^T_Y\}$ are computed to compensate both residual sample phase errors and chromatic dispersion, the symbol error $e_X$ will contain only a residual portion of the dispersion. In these embodiments, the cross-compensation vectors $H_{XX}$, $H_{XY}$, $H_{YY}$ and $H_{YX}$ will provide little or no additional dispersion compensation, but will still apply the needed phase rotation to de-convolve the symbols modulated onto the transmitted polarizations.

Figure 6:
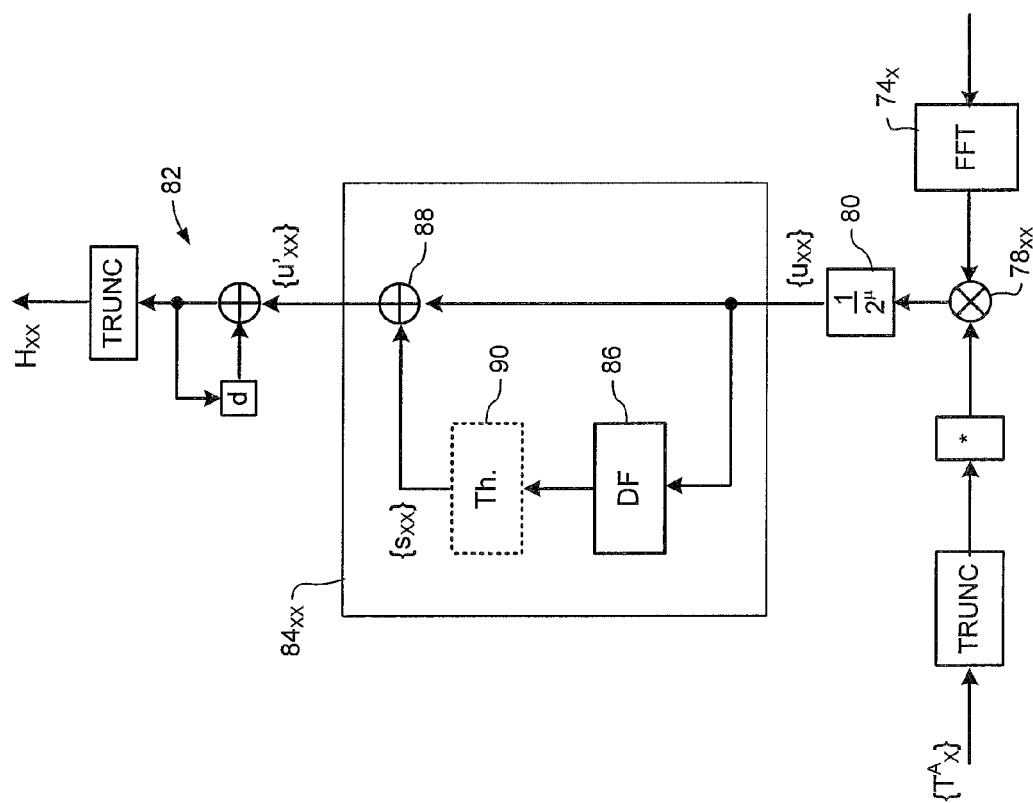
FIG. 6 illustrates a representative LMS loop for computing polarization compensation vectors in accordance with a second embodiment of the present invention.

A limitation of the embodiment of FIG. 5 is that noise tends to increase as the speed of the tracking of polarization rotation transients increases, e.g. to 50 kHz. It would be preferable to provide low noise, accurate, compensation, while at the same time enabling close tracking of polarization rotation transients of 50 kHz or more. FIG. 6 illustrates a modification of the LMS update loop of FIG. 5, in which this issue is addressed.

In the embodiment of FIG. 6, the $H_{XX}$ LMS update loop of FIG. 5a is modified by the addition of a "supercharger" block 84, which is inserted into the LMS loop between the scaling function 80 and the accumulator 82. In this embodiment, it is assumed that the compensation vectors $\{C^O_X\}$, $\{C^T_X\}$, $\{C^O_Y\}$ and $\{C^T_Y\}$ are computed to compensate at least the majority of the chromatic dispersion, as described above. In this case, the inventors have observed that as the polarization rotation rate tend towards zero, the intermediate arrays $\{T^A_X\}$ and $\{T^A_Y\}$ become highly de-correlated with the output of the respective LMS loop FFTs 74, and the resulting update vectors have very low magnitudes. Conversely, as the polarization rotation rate increases, the intermediate arrays $\{T^A_X\}$ and $\{T^A_Y\}$ become significantly correlated with their respective FFT outputs, and this is reflected in an increasing magnitude of the update vectors.

The inventors have further observed that under these conditions the time duration of the majority of a time domain version of the update vector $\{u_{xx}\}$ is relatively short. This limited time duration occurs because of the limited memory inherent in optical polarization effects. The long memory effects of chromatic dispersion have already been substantially compensated, as noted above. Any residual dispersion or other long memory effects generally only need slow tracking.

The supercharger block 84 exploits these observations by implementing an arrangement in which: 1) portions of the update vector $\{u_{xx}\}$ that lie outside the time duration of a polarization effect are suppressed; 2) fully detailed updates are allowed to slowly accumulate, enabling the slow tracking of long memory effects such as chromatic dispersion and line filtering; and 3) the magnitude of the enhanced update vector $\{u'_{xx}\}$ supplied to the accumulator 82 is scaled in proportion to the polarization rotation rate.

The suppression of portions of the update vector $\{u_{xx}\}$ lying outside the time duration of a polarization effect reduces the noise contribution from those portions, and so allows a higher LMS tracking speed without excessive added noise. However, since this suppression is incomplete, fully detailed updates are allowed to slowly accumulate, thereby enabling accurate tracking of slowly-changing impairments such as chromatic dispersion and line filtering. Indeed, rather than suppressing, the illustrated embodiment actually enhances the magnitude of the relevant time domain portions of the update vector. Finally, scaling the magnitude of the update vector $\{u_{xx}\}$ in proportion to the polarization rotation rate effectively increases the update step size of the important aspects of the update vectors during high speed transients, substantially without affecting the ability of the LMS update loop to provide accurate compensation (via a small update step size) during periods of low-speed polarization rotation.

As may be appreciated, there are various ways in which the Supercharger function may be implemented. In the embodiment of FIG. 6, the supercharger 84 is implemented as a frequency-domain digital filter 86 which receives the update vector $\{u_{xx}\}$ and a summation block 88 for adding the filter output vector $\{s_{xx}\}$ to the update vector $\{u_{xx}\}$ to yield the enhanced update vector $\{u'_{xx}\}$.

If desired, a threshold block 90 can be inserted at the output of the digital filter 86, as shown in dashed line in FIG. 6. The threshold block 90 can implement any of a variety of suitable linear and/or nonlinear functions to improve loop performance. A low gate-count embodiment is to implement a zeroing function, in which the "raw" filter output $\{s_{xx}\}$ from the digital filter 86 is multiplied by zero whenever the magnitude of $\{s_{xx}\}$ is less than a predetermined threshold. This can be done individually for each term of $\{s_{xx}\}$, or by making one decision for the whole vector based upon a vector magnitude metric, such as peak absolute value or sum of the squared magnitude of each of the vector terms.

As may be appreciated, the frequency domain filter 86 may be implemented in various ways. FIG. 7a illustrates a low-gate-count embodiment in which the frequency domain filter 86 is implemented as a cascade of summation blocks. Thus, for example, consider an embodiment in which the update vector $\{u_{xx}\}$ has a width of N=128 taps. These 128 taps can be separated into K=16 groups of 8 taps each. Within each group, the complex values on each tap are summed {at 92}, to yield a corresponding group sum B(k). A respective weighted summation value S(k) is then computed (at 94) for each group, using the group sum values B(k) of the group, and those of the three nearest neighbouring groups. In the embodiment of FIG. 6, for each group k, the weighted summation value S(k) is computed using the equation $$S(k) = \sum_{i=k-3}^{k+3} w(i) \cdot B(i),$$

where the weighting factor $w(i)=2^{-|k-i|}$, and modular arithmetic on the i provides the desirable circular wrap around characteristic.

For example, consider group k=8. The group sum B(k=8) will be the sum of the complex values on taps i=64 . . . 71 of the update vector. The weighted summation value S(k) will be computed as a weighted sum of the respective group sums B(i), i=5 . . . 11. The respective weighting factor w(i) applied to each group sum B(i) will be $w(i)=2^0=1$ for i=k, and then descending by powers of two for each of the three neighbouring groups. Thus, $w(i)=2^{-1}$ for i=k±1; $w(i)=2^{-2}$ for i=k±2; and $w(i)=2^{-3}$ for i=k±3.

The filter output vector $\{s_{xx}\}$, comprising the weighted summation value S(k) for each group, is optionally processed by the threshold block 90, and then added (at 88) to each of the group tap values of the update vector $\{u_{xx}\}$ to yield the enhanced update vector $\{u'_{xx}\}$. Thus, continuing the above example, the weighted summation value S(k=8) will be added back to each of the complex values on taps i=64 . . . 71 of the update vector $\{u_{xx}\}$.

With this arrangement, the value of S(k) will depend on the degree of correlation between the X-Polarization intermediate array $\{T^A{}_X\}$ and the FFT output vector. When the X-Polarization intermediate array $\{T^A{}_X\}$ and the FFT output vector are highly correlated, S(k) will have relatively large magnitude (in embodiments in which the threshold block 90 is used, S(k) will often be larger than the threshold), and so will have a strong effect on the enhanced update vector $\{u'_{XX}\}$, thereby improving the ability of the LMS update loop to track a rapidly changing polarization angle.

Conversely, when the X-Polarization intermediate array $\{T^A{}_X\}$ and the FFT output vector are highly uncorrelated (that is, when the polarization angle of the received optical signal is not significantly changing), S(k) will have a very low magnitude (in embodiments in which the threshold block 90 is used, S(k) will usually be lower than the threshold, and thus forced to zero), and so will have little or no effect upon the enhanced update vector $\{u'_{XX}\}$, thereby keeping the added noise to a small level.

Figure 7B:
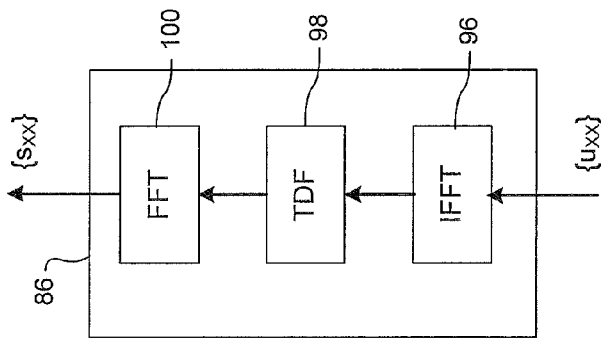
FIGS. 7a and 7b illustrate representative frequency domain filters usable in the LMS loop of FIG. 6.
Figure 7A:
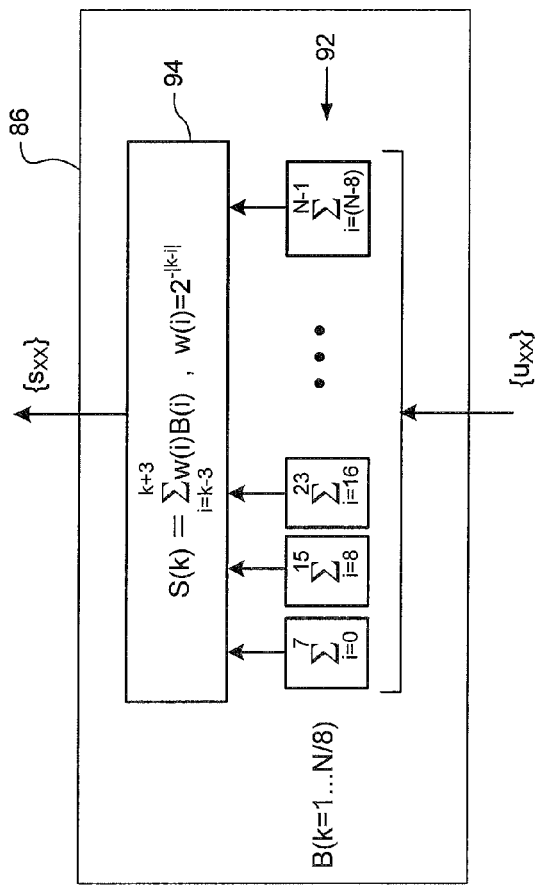

FIG. 7b illustrates an alternative embodiment in which the frequency domain filter 86 is implemented as an IFFT 96, Time-domain filter (TDF) 98 and FFT 100 blocks in sequence. In this case, the IFFT block 96 converts the update vector $\{u_{XX}\}$ to the time-domain, so that the TDF 98 can implement a windowing function that suppresses portions of the update vector $\{u_{XX}\}$ lying outside an expected duration of the polarization effect. The thus "windowed" time-domain update vector is then converted back into the frequency domain by the FFT block 100, to yield the output vector $\{s_{xx}\}$. Various other time-domain filter functions may also be implemented by the TDF 98 (either in addition to or instead of the windowing function) as desired.

The above description uses frequency domain LMS. Other adaptive methods can be used. Zero-forcing is a well known alternative algorithm, which suffers from less than optimal noise filtering. Time domain versions of LMS or other algorithms could be used. This frequency domain version of LMS has the advantage of a small gate-count and relatively fast convergence.

The configuration of FIG. 4 can be simplified by omitting the multiplication of the arrays $\{R^A{}_X\}$ and $\{R^A{}_Y\}$ by the compensation vectors $\{C^O{}_X\}$ and $\{C^O{}_Y\}$. Mathematical equivalence, to yield identical modified vectors $\{V^A{}_X\}$ and $\{V^A{}_Y\}$, can be obtained by dividing the transpose compensation vectors $\{C^T{}_X\}$ and $\{C^T{}_Y\}$ by $\{C^O{}_X\}$ and $\{C^O{}_Y\}$, respectively, and multiplying cross compensation vectors $H_{XX}$ and $H_{YX}$ by $\{C^O{}_X\}$, and multiplying $H_{YY}$ and $H_{XY}$ by $\{C^O{}_Y\}$. In a simple implementation, the $\{C^O{}_X\}$ and $\{C^O{}_Y\}$ multiplication blocks in the embodiment of FIG. 4 are omitted. The compensation vectors $\{C^T{}_X\}$ and $\{C^T{}_Y\}$ and cross compensation vectors $H_{XX}$, $H_{XY}$, $H_{YY}$ and $H_{YX}$ are then computed using the techniques described above, which will yield the appropriate values.

Other ways may be used for separating the response to slow long memory effects from the response to more rapid short memory effects. Pattern matching, transient speed measurement, time moments, error rates, nonlinear equalization, Jones Matrix calculations, and parameter estimations, are examples of methods that may be used, with varying gate-count requirements. Some of the slower parts of functions could be implemented in firmware.

Power based scaling or other scaling methods can be used to enhance the speed of the LMS tracking of the slower frequency components.

The embodiments of the invention described above are intended to be illustrative only. The scope of the invention is therefore intended to be limited solely by the scope of the appended claims.

We claim:

1. A signal equalizer for compensating impairments of an optical signal received through a link of a high speed optical communications network, the signal equalizer comprising:
    means for computing at least one set of compensation vectors for compensating a first type of impairments;
    an update block for computing a set of compensation coefficients for compensating a second type of impairments; and
    a frequency domain processor coupled to receive respective raw multi-bit in-phase (I) and quadrature (Q) sample streams of each received polarization of the optical signal, the frequency domain processor being configured to process the multi-bit sample streams using the compensation vectors and the compensation coefficients, in the frequency domain, to generate multi-bit estimates of symbols modulated onto each transmitted polarization of the optical signal;
    wherein a recalculation rate of the compensation coefficients is greater than that of the compensation vectors.

2. A signal equalizer as claimed in claim 1, wherein the first type of impairments comprises any one or more of:
    residual phase errors between each of the multi-bit sample streams; and
    chromatic dispersion of the link.

3. A signal equalizer as claimed in claim 1, wherein the second type of impairment comprises polarization effects.

4. A signal equalizer as claimed in claim 1, wherein the update block comprises a Least Mean Squares(LMS) update loop including, for each cross-compensation coefficient vector:
    means for computing a symbol distortion vector representing a total residual distortion of the multi-bit symbol estimates generated by the frequency domain processor in respect of a selected one of the transmitted polarizations;
    means for computing a correlation between a selected intermediate array and a frequency-domain representation of the symbol distortion vector;
    a vector scaler for scaling the computed correlation to generate an update vector; and
    an accumulator for accumulating successive update vector values to generate the cross-compensation coefficient vector.

5. A signal equalizer as claimed in claim 4, wherein the means for computing the symbol distortion vector comprises:
    a carrier phase detector for computing a phase error $\phi$ of each symbol estimate;
    a comparator for comparing a rotated symbol estimate, in which the computed phase error $\phi$ has been compensated, to a corresponding decision value of the symbol to generate a total residual error of the rotated symbol estimate; and
    a vector multiplier for multiplying the phase error $\phi$ and the total residual error, to yield the symbol distortion vector.

6. A signal equalizer as claimed in claim 4, wherein the means for computing the correlation between the selected intermediate array and the frequency-domain representation of the symbol distortion vector comprises:

an FFT block for computing the frequency domain representation of the symbol distortion vector, a width of the second FFT block corresponding to a width of the selected intermediate array; and a vector multiplier for multiplying a conjugate of the selected intermediate array with the computed frequency domain representation.

7. A signal equalizer as claimed in claim 6, further comprising means for retiming the frequency domain representation generated by the FFT block to match a timing of the selected intermediate array.

8. A signal equalizer as claimed in claim 6, further comprising means for truncating each value of the selected intermediate array to match a resolution of the frequency domain representation generated by the FFT block.

9. A signal equalizer as claimed in claim 4, wherein the LMS update loop further comprises a supercharger block for increasing a loop response during high-speed polarization transients, the supercharger block comprising:
a frequency-domain digital filter for filtering the update vector; and
a summation block for adding the filter result to the update vector to generate an enhanced update vector.

10. A signal equalizer as claimed in claim 9, wherein the frequency-domain digital filter comprises:
a first set of summation blocks, each summation block being connected to receive a respective group of taps of the update vector $\{u\}$, and being operative to compute a respective groups sum $B(k)$; and
a second summation block for computing a respective weighted sum for each group of taps, the weighted sum comprising a summation of the group sum values $B(k)$ of the group and a plurality of nearest neighboring groups.

11. A signal equalizer as claimed in claim 9, wherein the frequency-domain digital filter comprises:
a second Inverse Fast Fourier Transform (IFFT) block for converting the update vector to a time domain representation;
a time domain digital filter for imposing a windowing function, in the time domain, on the output of the second IFFT block; and
a third Fast Fourier Transform (FFT) block for converting the output of the time domain digital filter into a frequency domain representation.

12. A method of compensating impairments of an optical signal received through a link of a high speed optical communications network, the method comprising:
computing at least one set of compensation vectors, for compensating a first type of impairments;
computing at least one set of compensation coefficients for compensating a second type of impairments; and
digitally processing respective raw multi-bit in-phase (I) and quadrature (Q) sample streams of each received polarization of the optical signal, using the at least one set of compensation vectors and the at least one set of compensation coefficients, to generate multi-bit estimates of symbols modulated onto each transmitted polarization of the optical signal;
wherein a recalculation rate of the compensation coefficients is greater than that of the compensation vectors.

13. A method as claimed in claim 12, wherein the first type of impairments comprises any one or more of:
residual phase errors between each of the multi-bit sample streams; and chromatic dispersion of the link.

14. A method as claimed in claim 12, wherein the second type of impairment comprises polarization effects.

15. A method as claimed in claim 12, wherein computing at least one set of compensation coefficients comprises, for each cross-compensation coefficient vector:
computing a symbol distortion vector representing a total residual distortion of the multi-bit symbol estimates generated by the frequency domain processor in respect of a selected one of the transmitted polarizations;
computing a correlation between a selected intermediate array and a frequency-domain representation of the symbol distortion vector;
scaling the computed correlation to generate an update vector; and
accumulating successive update vector values to generate the cross-compensation coefficient vector.

16. A method as claimed in claim 15, wherein computing the symbol distortion vector comprises:
a computing a phase error $\phi$ of each symbol estimate;
comparing a rotated symbol estimate, in which the computed phase error $\phi$ has been compensated, to a corresponding decision value of the symbol to generate a total residual error of the rotated symbol estimate; and
multiplying the phase error $\phi$ and the total residual error, to yield the symbol distortion vector.

17. A method as claimed in claim 15, wherein computing the correlation between the selected intermediate array and the frequency-domain representation of the symbol distortion vector comprises:
computing the frequency domain representation of the symbol distortion vector, a width of the frequency domain representation corresponding to a width of the selected intermediate array; and
multiplying a conjugate of the selected intermediate array with the computed frequency domain representation.

18. A method as claimed in claim 17, further comprising retiming the frequency domain representation to match a timing of the selected intermediate array.

19. A method as claimed in claim 17, further comprising truncating each value of the selected intermediate array to match a resolution of the frequency domain representation.

20. A method as claimed in claim 15, further comprising:
filtering the update vector; and
adding the filter result to the update vector to generate an enhanced update vector;
wherein the enhanced update vector is accumulated to generate the cross-compensation coefficient vector.

21. A method as claimed in claim 20, wherein filtering the update vector comprises:
compute a respective group sum $B(k)$ of each one of a respective group of taps of the update vector; and
computing a respective weighted sum for each group of taps, the weighted sum comprising a summation of the group sum values $B(k)$ of the group and a plurality of nearest neighbouring groups.

22. A method as claimed in claim 20, wherein filtering the update vector comprises:
converting the update vector to a time domain representation;
imposing a windowing function, in the time domain, on the time domain representation of the update vector; and
converting the windowing function result into a frequency domain representation.

* * * * *